(12) United States Patent
Wang

(10) Patent No.: US 7,752,503 B2
(45) Date of Patent: Jul. 6, 2010

(54) CAN CONTROLLER SYSTEM

(76) Inventor: Yongchang Wang, 1357 W. Foothill Blvd., Azusa, CA (US) 91702

( * ) Notice: Subject to any disclaimer, the term of this patent is extended or adjusted under 35 U.S.C. 154(b) by 1427 days.

(21) Appl. No.: 11/150,527

(22) Filed: Jun. 9, 2005

(65) Prior Publication Data

US 2006/0279398 A1 Dec. 14, 2006

(51) Int. Cl.
*G06F 11/00* (2006.01)
(52) U.S. Cl. .............................. 714/48; 714/43; 714/49
(58) Field of Classification Search .................. 714/43, 714/48, 49
See application file for complete search history.

(56) References Cited

U.S. PATENT DOCUMENTS 6,959,403 B2 * 10/2005 Dierauer et al. ............... 714/49

2003/0226065 A1 * 12/2003 Shingaki ..................... 714/43

* cited by examiner

*Primary Examiner*—Jeremy C Norris
(74) *Attorney, Agent, or Firm*—Raymond Y. Chan; David and Raymond Patent Firm

(57) ABSTRACT

A Controller Area Network (CAN) controller for a plurality of electronic devices electrically connected to form a control circuit in a CAN system, includes a controller and a circuit configuring device. The controller is electrically connected with the electronic devices to form two circuit terminals of the control circuit. The circuit configuring device is electrically connected with the controller in such a manner that when the electrical disconnection occurs in the CAN system, the circuit configuring device will re-configure the control circuit for switching the two circuit terminals at the electrical disconnection of the respective electronic device to by-pass the electrical disconnection from the control circuit, such that the circuit configuring device is electrically re-connected to the two circuit terminals for completing the control circuit in a closed manner so as to keep the electronic devices functioning in the CAN system.

31 Claims, 7 Drawing Sheets

CAN CONTROLLER SYSTEM

BACKGROUND OF THE PRESENT INVENTION

1. Field of Invention

The present invention relates to a Controller Area Network (CAN), and more particularly to a CAN controller system which is capable of re-configuring a CAN bus network in case of accidental data bus breakage.

2. Description of Related Arts

Referring to FIG. 1 of the drawings, a conventional Controller Area Network (CAN) is a serial communications protocol which supports real time control of a wide variety of electronic devices, such as those of electronics in automobiles. FIG. 1 of the drawings illustrates that a plurality of electronics devices are electrically connected via CAN buses to form a closed circuit.

A well-known problem for this conventional CAN system for electronic devices is that when there exist accidental breaking of the any data bus in the CAN system, there may exist consequential break down of all the electronics devices beyond the point of breakage in the CAN system due to the inability of the CAN system to reconfigure itself. Since a common application of the CAN system is in automotive technology, if one of the electronics devices fails in the CAN system, rendering a number of electronic devices in the system to break down as well, there may be catastrophic consequence where the user of the CAN system is operating the automotive system, such as a car.

For example, if a CAN data bus connecting with an electrical operating system of a car, such as power seat, door, window, is malfunction, it may cause consequential failure of the electronic devices down the CAN system. In such a situation, the normal operation of the entire vehicle will be severely affected and the driver will be forced to stop the vehicle immediately and perform the necessary repair.

Moreover, where there is one point of breakage in the data buses, it will be very difficult for the user to discover the exact location of breakage. For example, in a conventional automobile where electronic devices are complexly and sophisticatedly connected in the CAN system, where breakage of the CAN system occurs, the user has search extensively the entire CAN system and every single electronic devices before he/she can ascertain which part of the CAN system goes wrong or which electronics device is out of order. This is both time-consuming and troublesome.

SUMMARY OF THE PRESENT INVENTION

A main object of the present invention is to provide a CAN controller for use in a CAN system which is capable of re-configuring the CAN system there is accidental breakage of a data bus in the CAN system, so that all electronic devices can still be functioning after re-configuration.

Another object of the present invention is to provide a CAN controller for use in a CAN system, which is capable of continuously detecting whether there is any data bus breakage of the CAN system so as to perform the appropriate reconfiguration in a real time basis. In other words, sever consequential failure of the entire device in which the CAN system is implemented can be prevented.

Another object of the present invention is to provide a CAN controller for use in a CAN system, which is capable of alerting the user of the device, such as the automobile, when there exists data bus breakage in the CAN system.

Another object of the present invention is to provide a CAN controller for use in a CAN system, which is easy to use and implemented in a user-friendly manner so as to promote wide-spread application of the present invention.

Another object of the present invention is to provide a method of configuring a control circuit of electronic devices in a CAN system having two circuit terminals, in which all electronic devices can still be functioning when there is data bus breakage in the CAN system.

Accordingly, in order to accomplish the above objects, the present invention provides a Controller Area Network (CAN) controller for a plurality of electronic devices electrically connected to form a control circuit in a CAN system, comprising:

a controller for electrically connecting with the electric devices to form two circuit terminals of the control circuit, wherein the controller comprises a signal detector, which is arranged for electrically connecting with the electric devices to detect an electrical connection with each of the electronic devices, generates an alert signal when the signal detector detects there is an electrical disconnection of the electronic device; and a circuit configuring device which is electrically connecting with the controller and is arranged for electrically coupling with the electronic devices at the two circuit terminals to form the control circuit in a closed circuit manner, wherein when the circuit configuring device receives the alert signal from the signal detector, the circuit configuring device re-configures the control circuit for switching the two circuit terminals at the electrical disconnection of the respective electronic device to by-pass the electrical disconnection from the control circuit, such that the circuit configuring device is electrically re-connected to the two circuit terminals for completing the control circuit in a closed manner so as to keep the electronic devices functioning in the CAN system.

Moreover, the present invention also provides a method of configuring a control circuit of electronic devices through a Controller Area Network (CAN) in a CAN system having two circuit terminals, comprising the steps of:

(a) completing the control circuit in a closed manner at the two circuit terminals;

(b) detecting an electrical connection with each of the electronic devices, wherein an alert signal is generated when there is an electrical disconnection of the electronic device;

(c) re-configuring the control circuit for switching the two circuit terminals at the electrical disconnection of the respective electronic device to by-pass the electrical disconnection from the control circuit; and (d) electrically re-connecting to the two circuit terminals for completing the control circuit in a closed manner so as to keep the electronic devices functioning in the CAN system.

These and other objectives, features, and advantages of the present invention will become apparent from the following detailed description, the accompanying drawings, and the appended claims.

DETAILED DESCRIPTION OF THE PREFERRED EMBODIMENT

Figure 1:
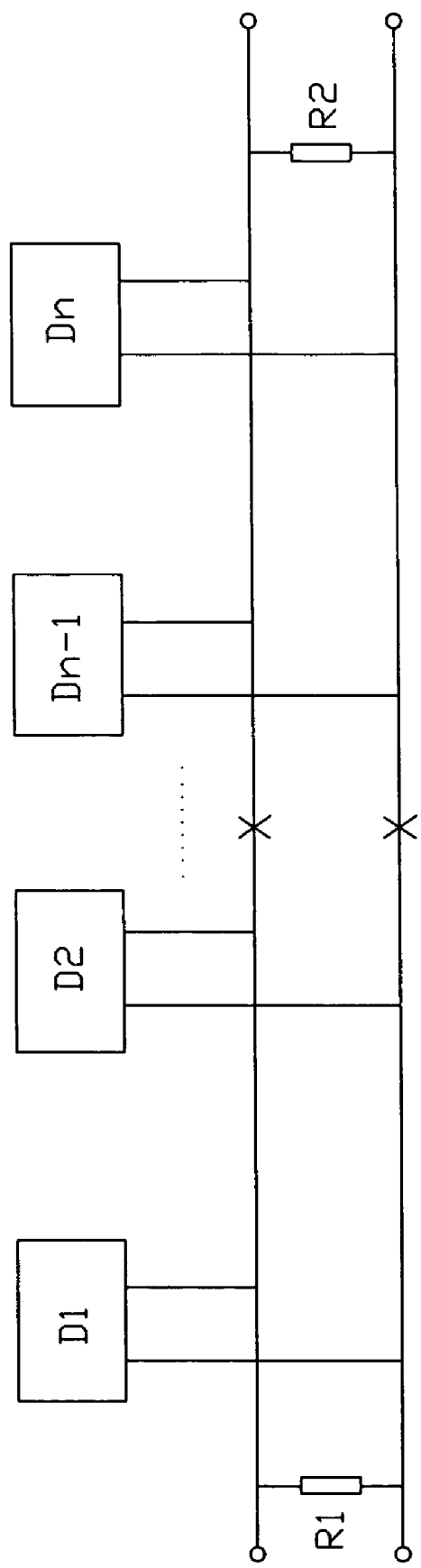
FIG. 1 is a conventional CAN system for a plurality of electronic devices.
Figure 2:
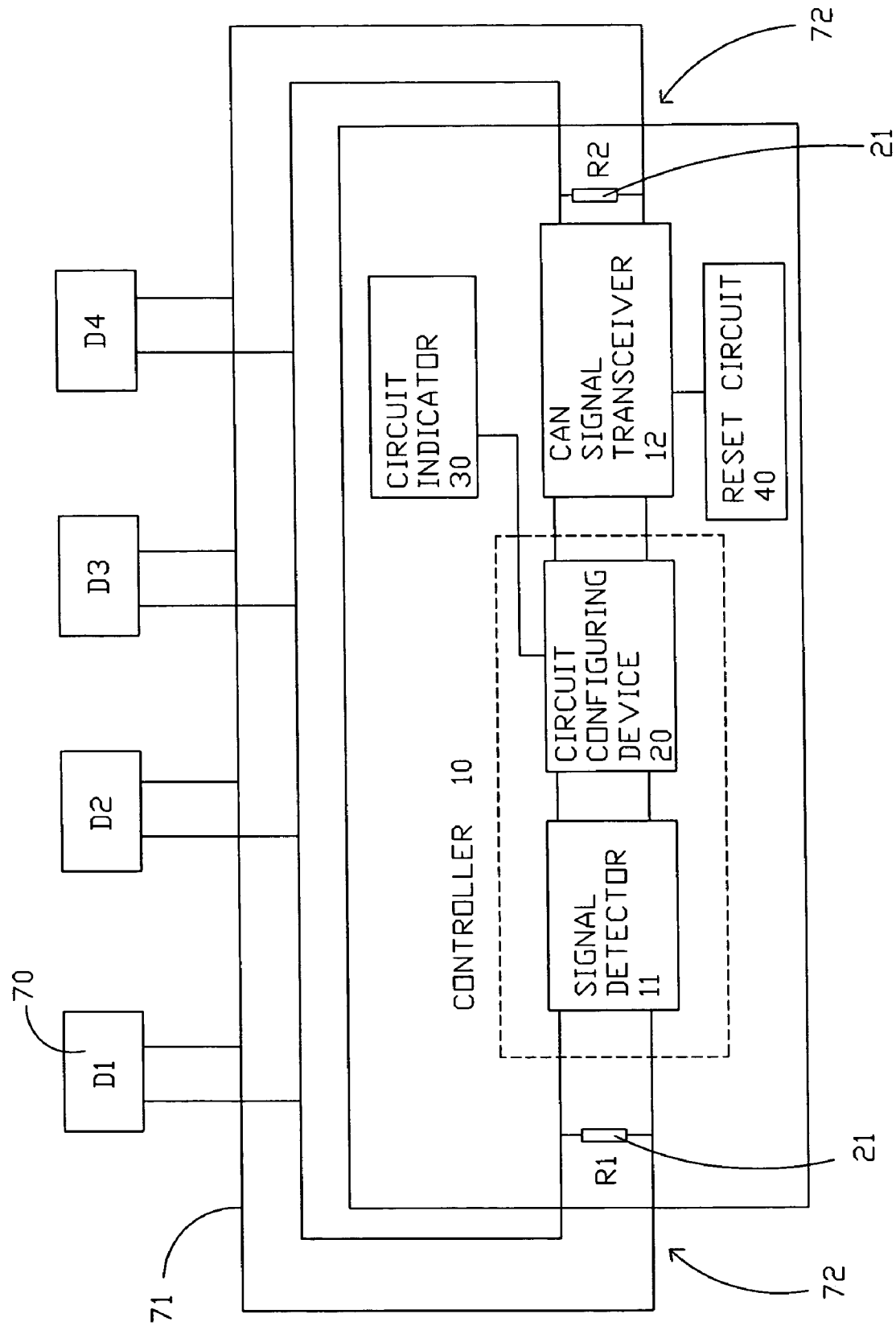
FIG. 2 is a schematic diagram of a CAN controller according to a preferred embodiment of the present invention.

Referring to FIG. 2 of the drawings, a Controller Area Network (CAN) controller for use in a CAN system according to a preferred embodiment of the present invention is illustrated, in which CAN system comprises a plurality of electronic appliances including a plurality of electronic devices 70 (e.g. D1, D2, D3 and D4) electrically connected by a plurality of data buses 71 to form a control circuit of the CAN system.

The CAN controller comprises a controller 10, and a circuit configuring device 20. According to the preferred embodiment of the present invention, the CAN system is utilized in an automobile wherein the electronic devices 70 of the electronic appliances are preferably embodied as typical electronic devices which are equipped in a conventional automobile.

The controller 10 is electrically connecting with the electronic devices 70 to form two circuit terminals 72 of the control circuit, wherein the controller 10 comprises a signal detector 11, which is arranged for electrically connecting with the electric devices 70 to detect an electrical connection with each of the electronic devices 70, and generates an alert signal when the signal detector 11 detects that there is an electrical disconnection of the corresponding electronic device 70.

The circuit configuring device 20 is electrically connecting with the controller 10 and is arranged for electrically coupling with the electronic devices 70 at the two circuit terminals 72 to form the control circuit in a closed circuit manner, wherein when the circuit configuring device 20 receives the alert signal from the signal detector 11, the circuit configuring device 20 will re-configure the control circuit for switching the two circuit terminals 72 at the point of electrical disconnection of the respective electronic device 70 to by-pass the electrical disconnection from the control circuit, such that the circuit configuring device 20 is electrically re-connected to the two circuit terminals 71 for completing the control circuit in a closed manner so as to keep the electronic devices 70 functioning in the CAN system.

Figure 3:
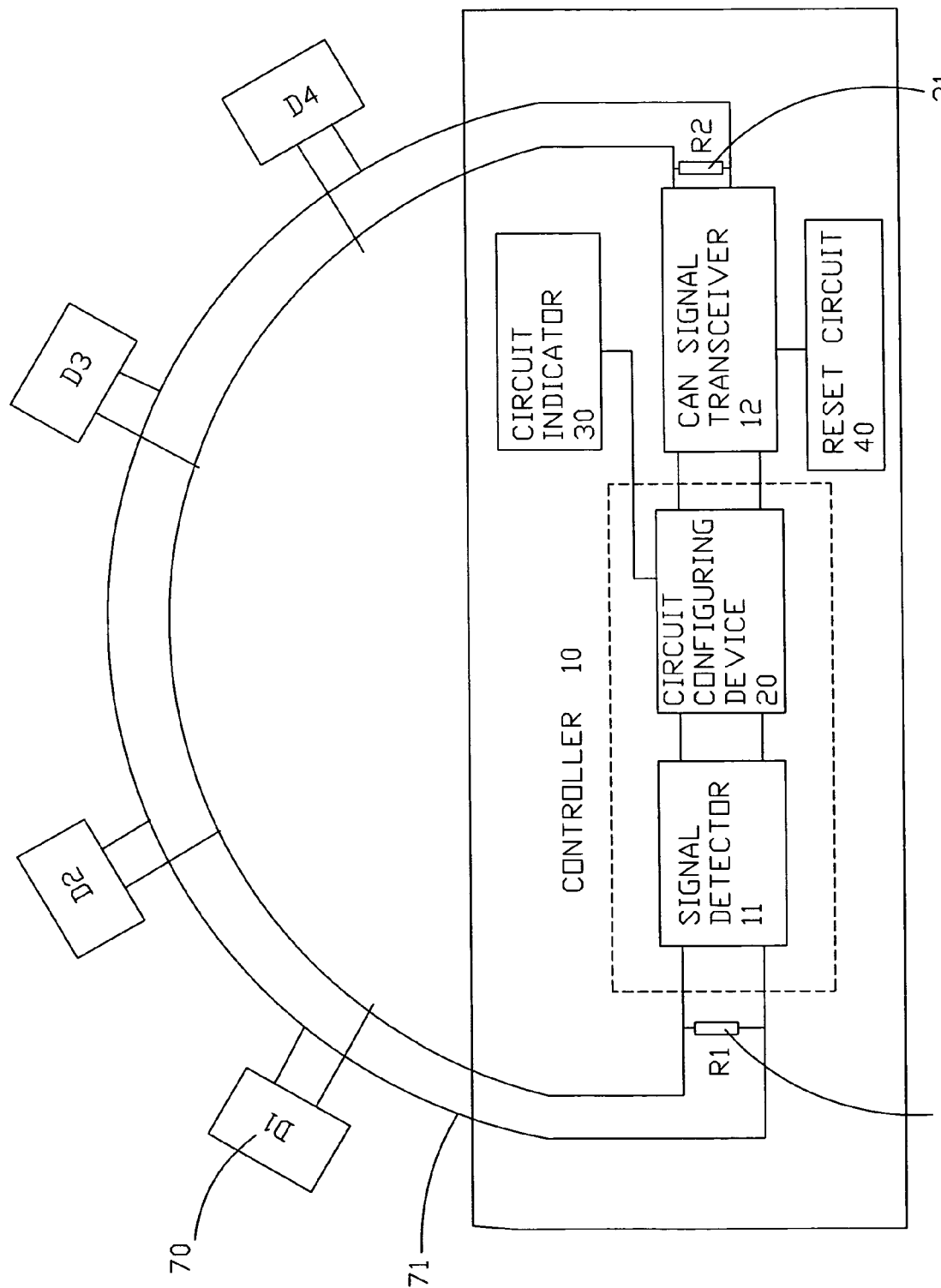
FIG. 3 is a block diagram of the CAN controller according to the above preferred embodiment of the present invention.

Referring to FIG. 2 to FIG. 3 of the drawings, in order to detect an electrical connection of the various electronic devices 70, the controller 10 further comprises a CAN signal transceiver 12 electrically coupled with the signal detector 11 and the electronic devices 70 in the CAN system to generate a CAN detection signal transmitted to each of the electronic devices 70 via the data buses 71 for periodically or continuously prompting a plurality of device responses from the electronic devices 70 in order to verify an uninterrupted electrical connection at the corresponding electronic devices 70. Each of the electronic devices 70, upon receipt of the CAN detection signal, will then generate a feedback signal which is arranged to transmit to the signal detector 11 so as to verify a sound and uninterrupted electrical connection at the corresponding electronic device 70. As a result, where the signal detector 11 does not receive feedback signal from any of the electronic devices 70, meaning that the electrical connection at the corresponding electronic device 70 has been broken or interrupted, the signal detector 11 will then generate the alert signal to the circuit configuring device 20 for reconfiguring the entire CAN system so as to reconnect each of the electronic devices 70 for reviving their normal applications.

Figure 4A:
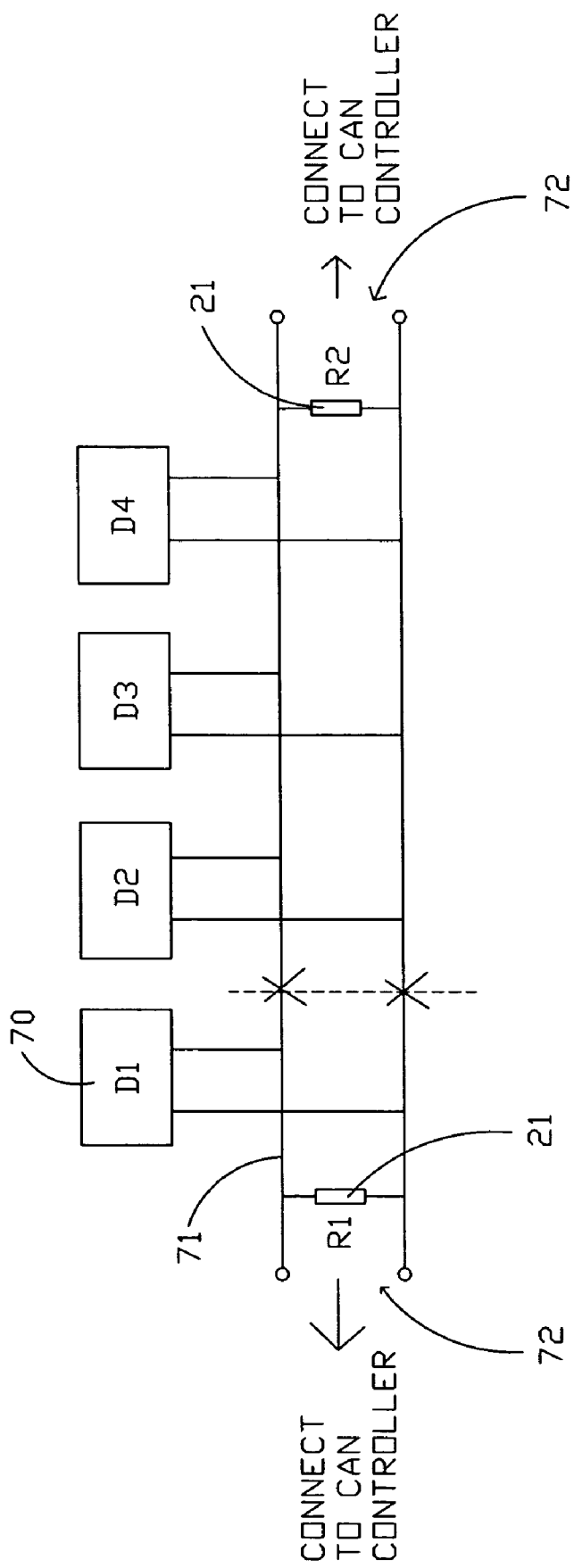
FIG. 4A and FIG. 4B are schematic diagrams of the CAN system connecting with the CAN controller according to the above preferred embodiment of the present invention, illustrating that how the CAN system can be reconfigured.

Referring to FIG. 2, FIG. 3, FIG. 4A and FIG. 4B of the drawings, the CAN system comprises two resistor devices 21 (R1 and R2) electrically connected at two circuit terminals 72 of the control circuit respectively wherein the CAN controller is electrically connected at the two circuit terminals 72 of the control circuit to form a closed circuit thereof. When the electrical connection at one of the electronic devices 70 breaks in the CAN system, the control circuit is rendered open so that the electronic devices 70 down the point of electrical disconnection at the relevant data bus will eventually be cut off of electrical connection and become fail to function, as shown in FIG. 4A of the drawings.

Figure 4B:
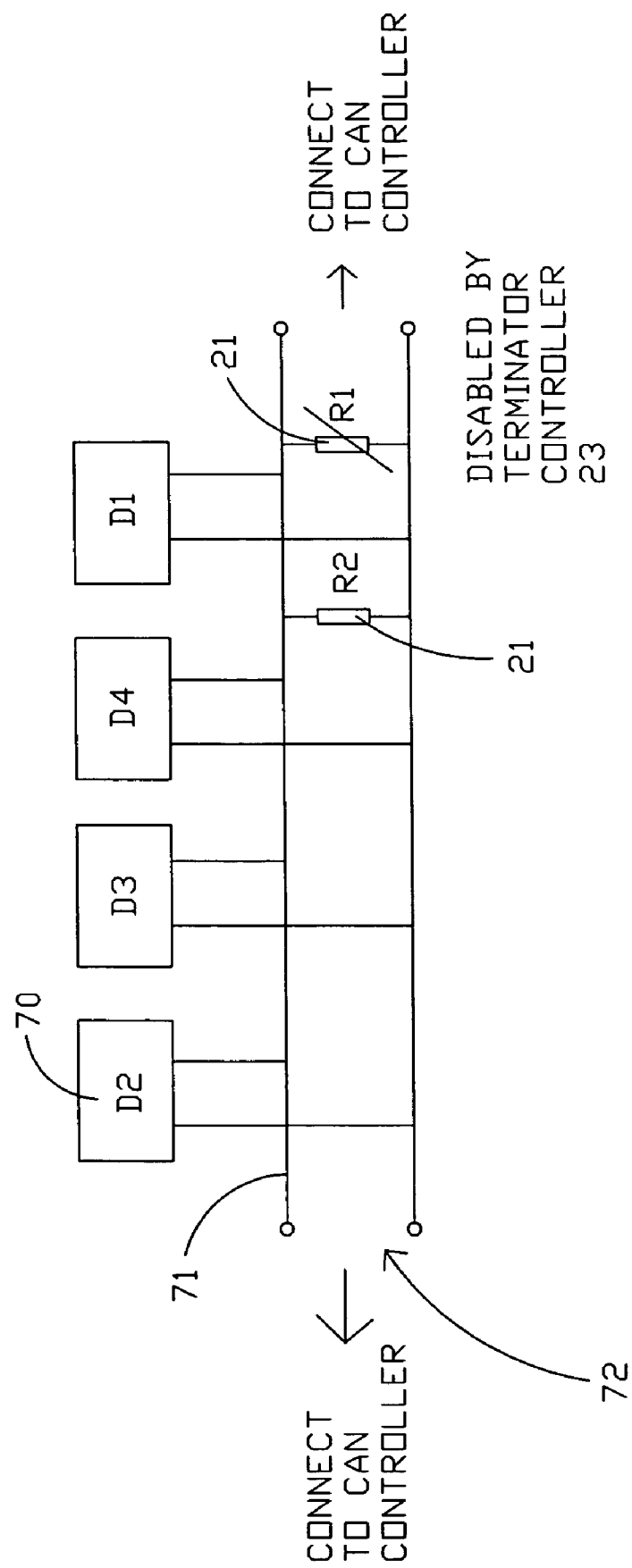

In such a situation, the circuit configuring device 20 will switch the electrical connection from the original circuit terminals 72 to the point of electrical disconnection so as to by-pass that point of electrical disconnection for closing the circuit which has been rendered open as a result of the circuit breakage of the CAN system. In order to close or complete the otherwise opened control circuit, one of the resistor devices 21 will be disabled by the configuring device 20 such that all of the electronic devices 70 are electrically reconnected to continue functioning, as shown in FIG. 4B of the drawings.

It is worth mentioning that, in order to achieve the above-mentioned objects, the CAN controller of the present invention can be incorporated to the control circuit of the CAN system such that the circuit configuring device 20 comprise two resistor devices 21 electrically coupled at the two circuit terminals 72 of the control circuit of the CAN system for electrically controlling an operation of the electronic devices 70 in the CAN system via the data buses.

More specifically, the circuit configuring device 20 comprises a circuit switching device 22 electrically connecting with the control circuit to form the two circuit terminals 72 at the two resistor devices 21 respectively, such the all the electronic devices 70 are electrically connecting in parallel in the CAN system. Once an electrical connection to any one of the electronic devices breaks down, the circuit configuring device 20 will be alerted by the alert signal sent from the signal detector 11 of the controller 10 and receives the corresponding information about the point of breakage as detected by the signal detector 11. Then, circuit switching device 22 is adapted to switch the two circuit terminals 72 of the control circuit to the point of electrical disconnection so as to re-configure the control circuit in the above-mentioned closed manner.

According to the preferred embodiment of the present invention, the CAN signal transceiver 12 of the controller 10, which comprises a CAN signal transmitter and a CAN signal receiver, is capable of transmitting the CAN detection signal to the electronic devices 70 for detecting the electrical connections at those electronic devices 70 in the CAN system. As a result, any electrical disconnection of any electronic device 70 will render no response from the relevant electronic device 70 to the signal detector 11 which will then generate the alert signal to the circuit configuring device 20. For the present invention, the CAN signal transceiver 12 is adapted to generate TTL signal (CAN detection signal) for the CAN system in the form of a predetermined device identification code jointly recognized by the electronics devices 70 and the signal detector 11.

The circuit configuring device 20 further comprises a terminator controller 23 electrically connected with the two resistor devices 21 and adapted to control an operation thereof so as to selectively disable either or both resistor devices 21 for reconfiguring the entire CAN system in the above-mentioned fashion. In other words, the resistor devices 21 are selectively disabled by the terminator controller 23 for re-connecting the otherwise opened CAN system, as shown in FIG. 4B of the drawings.

Moreover, in order to facilitate maintenance of the CAN system, the CAN controller further comprises a circuit indicator 30 electrically coupling with the controller 10 to generate an indicating signal when one of the electronic devices 70 is electrically disconnected from the control circuit, wherein the circuit indicator 30 particularly indicates a location of the electrical disconnection of the control circuit with respect to the electronic device 70 after the control circuit is re-configured to re-complete the control circuit in a closed manner.

Accordingly, CAN controller further comprises a reset circuit 40 electrically coupling with the circuit configuring device 20 to reset the control circuit back to an original circuit configuration after the control circuit is re-configured. As a result, the user may be able to perform the necessary repair to the CAN system and then reset the entire control circuit to detect future break down of electrical connection in the CAN system.

Figure 5:
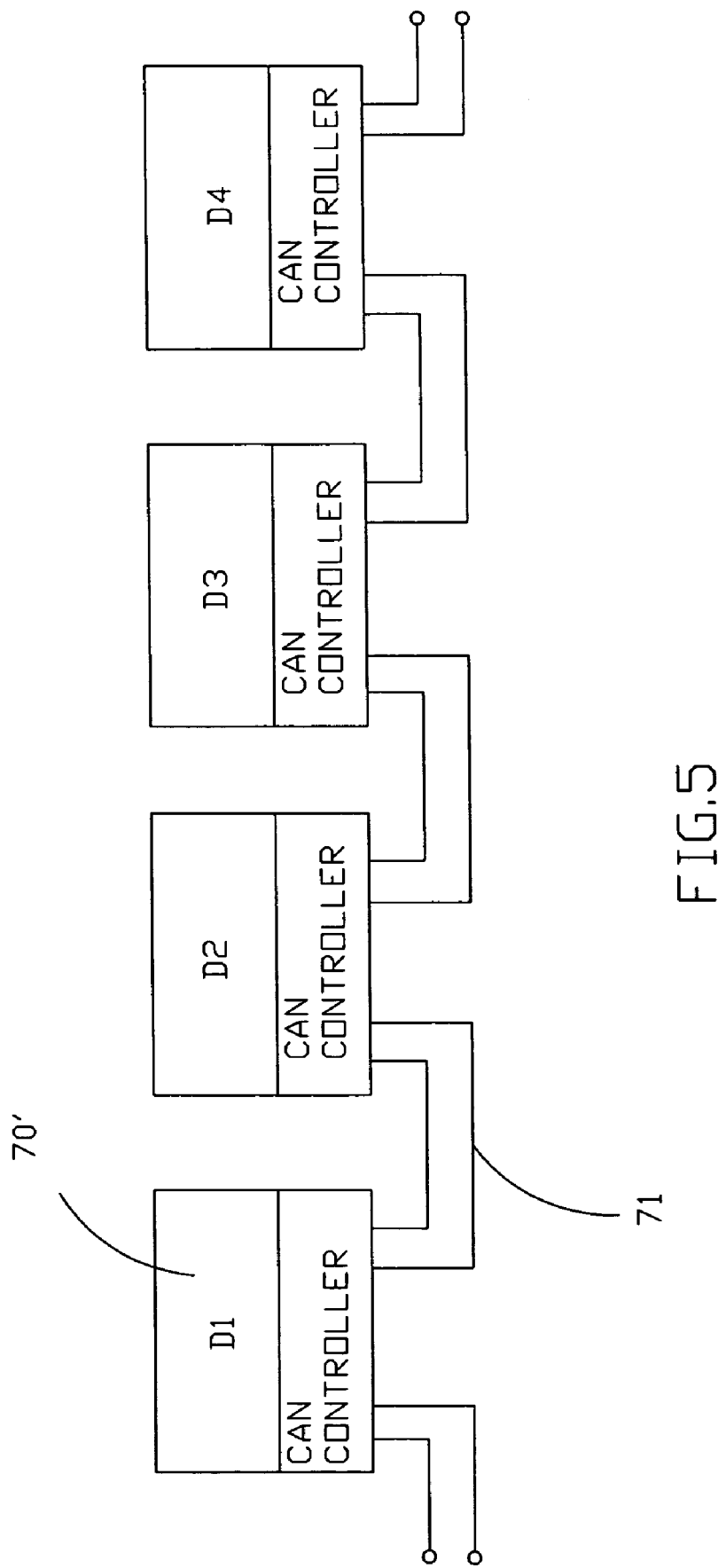
FIG. 5 is an alternative mode of the CAN system incorporating with the CAN controller according to the above preferred embodiment of the present invention.

Referring to FIG. 5 of the drawings, an alternative mode of the CAN controller incorporating with a CAN system is illustrated. According to the alternative mode, the electronic devices 70' are electrically connected in the CAN system in series, in which a plurality of the CAN controllers is electrically incorporated into the electronic devices 70' respectively. In such a case, the CAN controller only detects any electrical disconnection of the electronic device 70' with which it is incorporated so that when the electrical connection at that electronic device 70' is broken, the circuit configuring device 20 will reconfigure the electrical connect to that corresponding electronic device 70' for completing what is otherwise an opened CAN system due to the electrical connection breakage.

Figure 6:
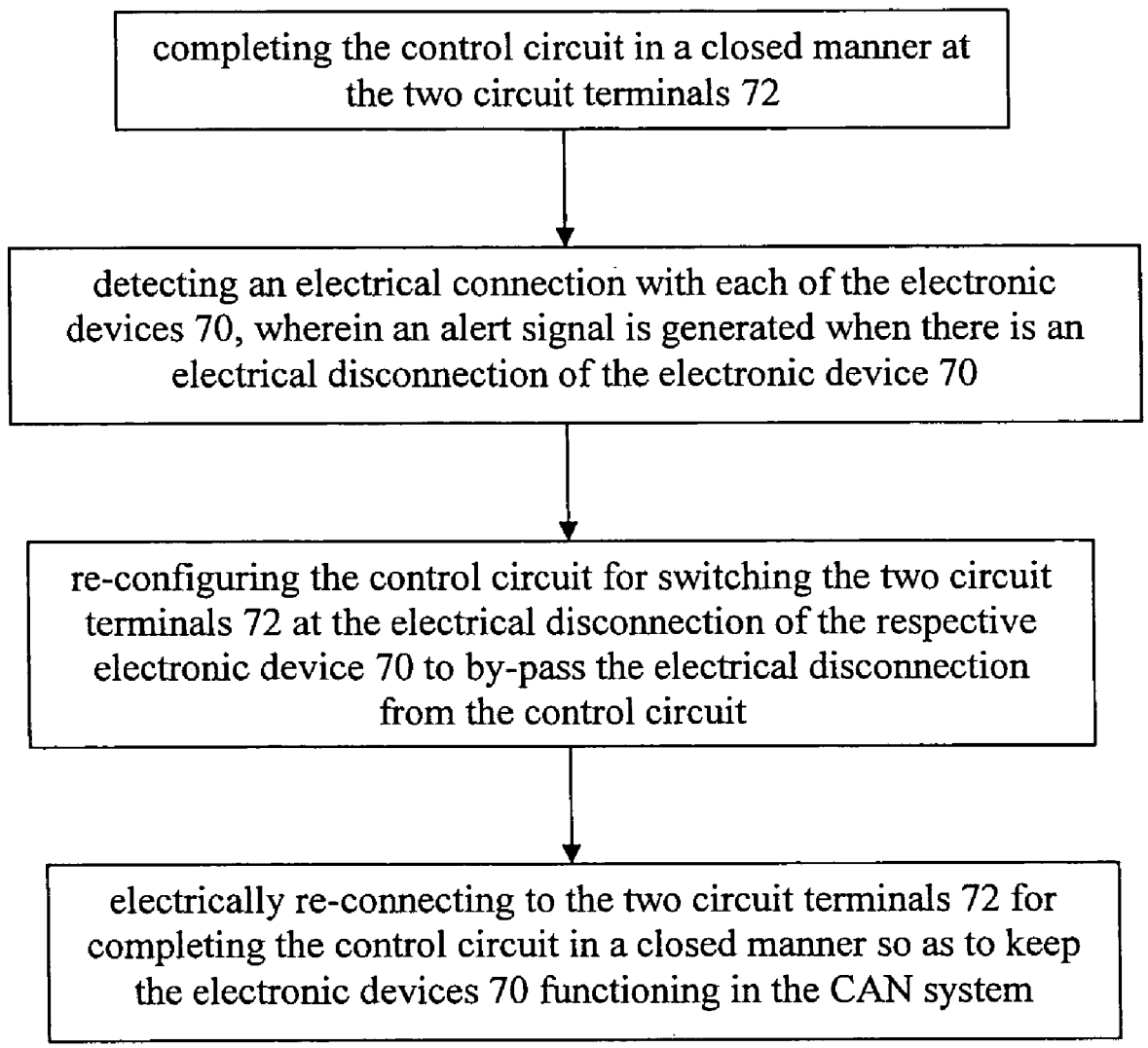
FIG. 6 is a schematic diagram of a method of configuring a control circuit of electronic devices through a Controller Area Network (CAN) in a CAN system according to the above preferred embodiment of the present invention.

Referring to FIG. 6 of the drawings, a method of configuring a control circuit of electronic devices 70 through a Controller Area Network (CAN) in a CAN system having two circuit terminals 72, comprising the steps of:

(a) completing the control circuit in a closed manner at the two circuit terminals 72;

(b) detecting an electrical connection with each of the electronic devices 70, wherein an alert signal is generated when there is an electrical disconnection of the electronic device 70;

(c) re-configuring the control circuit for switching the two circuit terminals 72 at the electrical disconnection of the respective electronic device 70 to by-pass the electrical disconnection from the control circuit; and (d) electrically re-connecting to the two circuit terminals 72 for completing the control circuit in a closed manner so as to keep the electronic devices 70 functioning in the CAN system.

As mentioned above, according to the preferred embodiment of the present invention, the CAN system is preferably embodied as comprising two resistor devices 21 electrically connected at two circuit terminals 72 respectively for completing a closed circuit of the CAN system. As a result, in order to reconfigure the CAN system in case of data bus broke down, step (c) comprises the steps of:

(c.1) disabling at least one of the resistor devices 21, wherein the resistor devices 21 are electrically coupled at the two circuit terminals 72 respectively; and (c.2) re-configuring another of the resistor devices at one of the circuit terminals 72 when one of the resistor devices 21 is disabled for completing the CAN system as a closed circuit.

In step (d), the two circuit terminals 72 are reconnected to the point of electrical disconnection of the relevant electronic device 70 so as to by-pass the point of electrical disconnection for electrically re-connecting the entire CAN system. In effect, the two terminals are reconfigured and reconnected at the point of electrical disconnection while one of the resistor devices 21 is disabled.

In order to detect for any electrical disconnection at the electronic devices 70, step (b) comprises the steps of:

(b.1) sending an CAN detection signal to each of the electronic devices 70 by a CAN signal transceiver 12 via the CAN system at a predetermined time period;

(b.2) receiving a feedback signal from each of the electronic devices 70 to confirm the electronic devices 70 are electrically connected in the control circuit; and (b.3) generating the alert signal for reconfiguring the control circuit of the CAN system when there is no feedback signal responding back from the respective electronic devices 70.

Thus, step (b.3) comprises a sub-step of locating a point of electrical disconnection in the CAN system by reference to the electronic device 70 which does not transmit a feedback signal for indicating a normal electrical connection in the control circuit of the CAN system.

In step (b), the detection is performed by the controller 10, wherein when any electronic device 70 does not send the feedback signal back to the controller 10, it is presumed that the electrical connection at the electronic device 70 has been disconnected or interrupted. As such, electrical reconfiguration is needed to make all of the electronic devices 70 continue functioning.

According to the preferred embodiment of the present invention, step (d) comprises a step (d.1) of generating an indicating signal when one of the electronic devices 70 is electrically disconnected from the control circuit to indicate a location of the electrical disconnection of the control circuit with respect to the electronic device 70 after the control circuit is re-configured to re-complete the control circuit in a closed manner.

When the electrical disconnection has been fixed, the method further comprises a step (e) of resetting the control circuit back to an original circuit configuration after the control circuit is re-configured. As a result, the CAN system is ready for use again and the CAN controller is now ready to detect any further electrical disconnection again.

From the forgoing descriptions, it can be shown that the above objects have been substantially accomplished. The present invention provides a CAN system and a method thereof which are capable of re-configuring a CAN data bus network in case of accidental data bus breakage, so as to keep all electronic devices 70 continue to work.

Finally, it is worth mentioning that the present invention is meant to keep all of the electronic devices 70 working in order to prevent incidents which may arise from possible failure of the electronic devices 70 due to electrical disconnection in the CAN system. As a result, the user of the present invention may ultimately need to fix the electrical disconnection in the CAN system as soon as possible.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A Controller Area Network (CAN) controller for a vehicle having a plurality of electronic appliances electrically connected in a CAN system having a control circuit, comprising:
   a controller for electrically connecting with said electronic appliances to detect an electrical connection with each of said electronic appliances; and
   a circuit configuring device which is electrically connecting with said controller and is arranged for electrically coupling with said electronic appliances, wherein said circuit configuring device re-configures said control circuit for by-passing an electrical disconnection from said control circuit and for completing said control circuit in a closed manner so as to keep said electronic appliances functioning in said CAN system.

2. The CAN controller, as recited in claim 1, wherein said controller for electrically connecting with said electronic appliances to form two circuit terminals of said control circuit, wherein said controller comprises a signal detector, which is arranged for electrically connecting with said electric devices to detect said electrical connection with each of said electronic appliances, generates an alert signal when said signal detector detects there is an electrical disconnection of said electronic appliance, wherein said circuit configuring device which is electrically connecting with said controller and is arranged for electrically coupling with said electronic appliances at said two circuit terminals to form said control circuit in a closed circuit manner, wherein when said circuit configuring device receives said alert signal from said signal detector, said circuit configuring device re-configures said control circuit for switching said two circuit terminals at said electrical disconnection of said respective electronic appliance to by-pass said electrical disconnection from said control circuit, such that said circuit configuring device is electrically re-connected to said two circuit terminals for completing said control circuit in a closed manner so as to keep said electronic appliances functioning in said CAN system.

3. The CAN controller, as recited in claim 2, wherein said controller further comprises a CAN signal transceiver, which is electrically coupled with said signal detector for communicating with said electronic appliances in said CAN system, generating a CAN detection signal transmitting to each of said electronic appliances for prompting feedback signals therefrom to verify an uninterrupted electrical connection at said corresponding electronic appliances, wherein when said signal detector does not receive feedback signal from said electronic appliances, said signal detector generates said alert signal to said circuit configuring device for reconfiguring said CAN system.

4. The CAN controller, as recited in claim 3, wherein said CAN signal transceiver of said controller comprises a CAN signal transmitter for transmitting said CAN detection signal to said electronic appliances so as to detect electrical connections of said electronic appliances of said control circuit in said CAN system.

5. The CAN controller, as recited in claim 4, wherein said circuit configuring device comprise two resistor devices electrically connected at said two circuit terminals of said control circuit respectively for electrically coupling with said CAN system, wherein when said signal detector detects said electrical disconnection of said electronic appliances, said signal detector generates said alert signal to said circuit configuring device to disable one of said resistor devices for reconfiguring said control circuit.

6. The CAN controller, as recited in claim 4, wherein said circuit configuring device comprises a circuit switching device electrically connecting with said controller for selectively arranging said two circuit terminals at said control circuit such that when one of said electronic appliances is electrically disconnected from said control circuit, said circuit switching device automatically re-configures said control circuit to switch said two circuit terminals at a point of said electrical disconnection of said control circuit so as to re-complete said control circuit in said closed manner.

7. The CAN controller, as recited in claim 5, further comprising a circuit indicator electrically coupling with said controller to generate an indicating signal when one of said electronic appliances is electrically disconnected from said control circuit, wherein said circuit indicator particularly indicates a location of said electrical disconnection of said control circuit with respect to said electronic appliance after said control circuit is re-configured to re-complete said control circuit in a closed manner.

8. The CAN controller, as recited in claim 5, wherein said circuit configuring device further comprises a terminator controller electrically connected with said two resistor devices to control an operation thereof so as to selectively disable at least one of said resistor devices for reconfiguring said control circuit when one of said electronic appliance is electrically disconnected with said control circuit.

9. The CAN controller, as recited in claim 8, wherein said circuit configuring device comprises a circuit switching device electrically connecting with said controller for selectively arranging said two circuit terminals at said control circuit such that when one of said electronic appliances is electrically disconnected from said control circuit, said circuit switching device automatically re-configures said control circuit to switch said two circuit terminals at a point of said electrical disconnection of said control circuit so as to re-complete said control circuit in said closed manner.

10. The CAN controller, as recited in claim 9, further comprising a circuit indicator electrically coupling with said controller to generate an indicating signal when one of said electronic appliances is electrically disconnected from said control circuit, wherein said circuit indicator particularly indicates a location of said electrical disconnection of said control circuit with respect to said electronic appliance after said control circuit is re-configured to re-complete said control circuit in a closed manner.

11. The CAN controller, as recited in claim 10, further comprising a reset circuit electrically coupling with said circuit configuring device to reset said control circuit back to an original circuit configuration after said control circuit is re-configured.

12. The CAN controller, as recited in claim 9, further comprising a reset circuit electrically coupling with said circuit configuring device to reset said control circuit back to an original circuit configuration after said control circuit is re-configured.

13. The CAN controller, as recited in claim 8, further comprising a circuit indicator electrically coupling with said controller to generate an indicating signal when one of said electronic appliances is electrically disconnected from said control circuit, wherein said circuit indicator particularly indicates a location of said electrical disconnection of said control circuit with respect to said electronic appliance after said control circuit is re-configured to re-complete said control circuit in a closed manner.

14. The CAN controller, as recited in claim 3, wherein said circuit configuring device comprise two resistor devices electrically connected at said two circuit terminals of said control circuit respectively for electrically coupling with said CAN system, wherein when said signal detector detects said electrical disconnection of said electronic appliances, said signal detector generates said alert signal to said circuit configuring device to disable one of said resistor devices for reconfiguring said control circuit.

15. The CAN controller, as recited in claim 14, wherein said circuit configuring device further comprises a terminator controller electrically connected with said two resistor devices to control an operation thereof so as to selectively disable at least one of said resistor devices for reconfiguring said control circuit when one of said electronic appliance is electrically disconnected with said control circuit.

16. The CAN controller, as recited in claim 5, wherein said circuit configuring device comprises a circuit switching device electrically connecting with said controller for selectively arranging said two circuit terminals at said control circuit such that when one of said electronic appliances is electrically disconnected from said control circuit, said circuit switching device automatically re-configures said control circuit to switch said two circuit terminals at a point of said electrical disconnection of said control circuit so as to re-complete said control circuit in said closed manner.

17. The CAN controller, as recited in claim 2, wherein said circuit configuring device comprise two resistor devices electrically connected at said two circuit terminals of said control circuit respectively for electrically coupling with said CAN system, wherein when said signal detector detects said electrical disconnection of said electronic appliances, said signal detector generates said alert signal to said circuit configuring device to disable one of said resistor devices for reconfiguring said control circuit.

18. The CAN controller, as recited in claim 17, wherein said circuit configuring device further comprises a terminator controller electrically connected with said two resistor devices to control an operation thereof so as to selectively disable at least one of said resistor devices for reconfiguring said control circuit when one of said electronic appliance is electrically disconnected with said control circuit.

19. The CAN controller, as recited in claim 2, wherein said circuit configuring device comprises a circuit switching device electrically connecting with said controller for selectively arranging said two circuit terminals at said control circuit such that when one of said electronic appliances is electrically disconnected from said control circuit, said circuit switching device automatically re-configures said control circuit to switch said two circuit terminals at a point of said electrical disconnection of said control circuit so as to re-complete said control circuit in said closed manner.

20. The CAN controller, as recited in claim 2, further comprising a circuit indicator electrically coupling with said controller to generate an indicating signal when one of said electronic appliances is electrically disconnected from said control circuit, wherein said circuit indicator particularly indicates a location of said electrical disconnection of said control circuit with respect to said electronic appliance after said control circuit is re-configured to re-complete said control circuit in a closed manner.

21. The CAN controller, as recited in claim 2, further comprising a reset circuit electrically coupling with said circuit configuring device to reset said control circuit back to an original circuit configuration after said control circuit is re-configured.

22. A method of configuring a control circuit of electronic appliances of a vehicle through a Controller Area Network (CAN) in a CAN system having two circuit terminals, comprising the steps of:
(a) completing said control circuit in a closed manner at said two circuit terminals;
(b) detecting an electrical connection with each of said electronic appliances, wherein an alert signal is generated when there is an electrical disconnection of said electronic appliance;
(c) re-configuring said control circuit for switching said two circuit terminals at said electrical disconnection of said respective electronic appliance to by-pass said electrical disconnection from said control circuit; and
(d) electrically re-connecting to said two circuit terminals for completing said control circuit in a closed manner so as to keep said electronic appliances functioning in said CAN system.

23. The method, as recited in claim 22, wherein said step (c) comprises the steps of:
(c.1) disabling at least one of two resistor devices, wherein said two resistor devices are electrically coupled at said two circuit terminals respectively; and
(c.2) re-configuring another of said resistor devices at one of said circuit terminals when another said resistor device is disabled for completing said CAN system in a closed manner.

24. The method, as recited in claim 23, wherein said step (b) comprises the steps of:
(b.1) sending a CAN detection signal to each of said electronic appliances at a predetermined time period; and
(b.2) receiving a feedback signal from each of said electronic appliances to confirm said electronic appliances are electrically connected in said control circuit;
(b.3) generating said alert signal for reconfiguring said control circuit of said CAN system when there is no feedback signal responding back from said respective electronic appliances.

25. The method, as recited in claim 24, wherein said step (d) comprises a step of:
(d.1) generating an indicating signal when one of said electronic appliances is electrically disconnected from said control circuit to indicate a location of said electrical disconnection of said control circuit with respect to said electronic appliance after said control circuit is re-configured to re-complete said control circuit in a closed manner.

26. The method, as recited in claim 25, further comprising a step of:
(e) resetting said control circuit back to an original circuit configuration after said control circuit is re-configured.

27. The method, as recited in claim 24, further comprising a step of:
(e) resetting said control circuit back to an original circuit configuration after said control circuit is re-configured.

28. The method, as recited in claim 23, wherein said step (d) comprises a step of:
(d.1) generating an indicating signal when one of said electronic appliances is electrically disconnected from said control circuit to indicate a location of said electrical disconnection of said control circuit with respect to said electronic appliance after said control circuit is re-configured to re-complete said control circuit in a closed manner.

29. The method, as recited in claim 22, wherein said step (b) comprises the steps of:
- (b.1) sending a CAN detection signal to each of said electronic appliances at a predetermined time period; and
- (b.2) receiving a feedback signal from each of said electronic appliances to confirm said electronic appliances are electrically connected in said control circuit;
- (b.3) generating said alert signal for reconfiguring said control circuit of said CAN system when there is no feedback signal responding back from said respective electronic appliances.

30. The method, as recited in claim 22, wherein said step (d) comprises a step of:
- (d.1) generating an indicating signal when one of said electronic appliances is electrically disconnected from said control circuit to indicate a location of said electrical disconnection of said control circuit with respect to said electronic appliance after said control circuit is re-configured to re-complete said control circuit in a closed manner.

31. The method, as recited in claim 22, further comprising a step of:
- (e) resetting said control circuit back to an original circuit configuration after said control circuit is re-configured.

* * * * *